(12) United States Patent
Kapels et al.

(10) Patent No.: US 8,026,704 B2
(45) Date of Patent: Sep. 27, 2011

(54) SYSTEM AND METHOD FOR CONTROLLING A CONVERTER

(75) Inventors: Holger Kapels, Holzkirchen (DE); Gerald Deboy, Klagenfurt (AT)

(73) Assignee: Infineon Technologies Austria AG, Villach (AT)

( * ) Notice: Subject to any disclaimer, the term of this patent is extended or adjusted under 35 U.S.C. 154(b) by 658 days.

(21) Appl. No.: 12/134,609

(22) Filed: Jun. 6, 2008

(65) Prior Publication Data

US 2009/0302814 A1    Dec. 10, 2009

(51) Int. Cl.
*G05F 1/40* (2006.01)
(52) U.S. Cl. .......................... 323/282; 323/222
(58) Field of Classification Search ............ 323/222, 323/282–285
See application file for complete search history.

(56) References Cited

U.S. PATENT DOCUMENTS

| | | | |
|---|---|---|---|
| 4,727,308 A | | 2/1988 | Huljak et al. |
| 5,264,780 A | | 11/1993 | Bruer et al. |
| 5,546,300 A | * | 8/1996 | Lee et al. ................. 363/132 |
| 5,894,214 A | * | 4/1999 | Jiang ........................ 323/222 |
| 6,700,801 B2 | * | 3/2004 | Morita et al. ............ 363/21.12 |
| 7,170,761 B2 | * | 1/2007 | Yasumura ................. 363/17 |
| 2007/0109822 A1 | | 5/2007 | Kuan | |
| 2008/0012545 A1 | | 1/2008 | Komiya | |

FOREIGN PATENT DOCUMENTS

| | | |
|---|---|---|
| DE | 3422777 C2 | 1/1990 |
| DE | 10227831 A1 | 1/2004 |
| DE | 10303779 A1 | 7/2004 |
| EP | 0336725 B1 | 7/1994 |
| EP | 0464246 B1 | 3/1995 |
| GB | 2357912 A | 7/2001 |

OTHER PUBLICATIONS

Huber et al., "Performance Evaluation of Bridgeless PFC Boost Rectifiers", Delta Products Corporation, 2007 (pp. 165-171).
Jang et al., "A Brdgeless PFC Boost Rectifier With Optmized Magnetic Utilization", IEEE Transactons on Power Electronics, vol. 24, No. 1, Jan. 2009 (pp. 85-93).

* cited by examiner

*Primary Examiner* — Jessica Han
(74) *Attorney, Agent, or Firm* — Dicke, Billig & Czaja, PLLC (57) ABSTRACT

A system and method for controlling a converter. One embodiment provides the cyclic actuation of a first switching element, used for applying an input voltage to an inductive storage element. A second switching element is used as a first rectifier element in a rectifier arrangement, in a step-up converter. An actuating circuit is provided for the first and second switching elements.

15 Claims, 8 Drawing Sheets

SYSTEM AND METHOD FOR CONTROLLING A CONVERTER

BACKGROUND

Step-up converters (boost converters) have an inductive storage element, a switching element for the clocked application of an input voltage to the inductive storage element, and a rectifier arrangement which is connected to the inductive storage element. The rectifier arrangement has a diode as a proficient rectifier element and a capacitive storage element which provides an output voltage.

During operation of such a step-up converter, the switching element is turned on cyclically for a turned-on period. During this turned-on period, energy is stored in the inductive storage element and the inductive storage element is magnetized thereby. When the switching element has been turned off, this stored energy is output to the rectifier arrangement.

In one known method the magnetization state of the inductive storage element is monitored and the switching element is respectively turned on again as soon as the inductive storage element is completely demagnetized. During the turned-off period of the switching element, the switching element has a voltage across it which corresponds approximately to the output voltage of the step-up converter. If the switching element has a parasitic capacitance, this capacitance is charged to the output voltage during the turned-off period and is discharged when the switching element is turned on again. This process results in switching losses, which are greater the greater the parasitic capacitance of the switching element.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

One embodiment relates to a method for the cyclic actuation of a first switching element, which is used for applying an input voltage to an inductive storage element, and of a second switching element, which is used as a first rectifier element in a rectifier arrangement, in a step-up converter. The method involves the following processes during an actuation cycle: turning on the first switching element for a first turned-on period, during which the second switching element is off; turning on the second switching element at the end of the first turned-on period or after the end of the first turned-on period for a second turned-on period; monitoring a current which flows through the second switching element or the inductive storage element during the second turned-on period, and terminating the second turned-on period following a change in the current direction of this current from a first current direction to an opposite second current direction.

Another embodiment relates to a step-up converter which has: input terminals for applying an input voltage; output terminals for providing an output voltage; an inductive storage element which is coupled to the input terminals; a first switching element, which is connected up for applying the input voltage to the inductive storage element; a rectifier arrangement having a first capacitive storage element and a second switching element, which rectifier arrangement is connected between the inductive storage element and the output terminals; a second capacitive storage element, which is connected between the input terminals; an actuating circuit for providing a first actuation signal for the first switching element and a second actuation signal for the second switching element.

Another embodiment relates to an actuating circuit for generating a first actuation signal for a first switching element, which is used for applying an input voltage to an inductive storage element, and a second actuation signal for a second switching element, which is used as a first rectifier element in a rectifier arrangement, in a step-up converter. The actuating circuit is designed so that during an actuation cycle it generates a turn-on level for the first actuation signal for a first turned-on period and generates a turn-off level for the second actuation signal during this first turned-on period; generates a turn-on level for the second actuation signal at the end of the first turned-on period or after the end of the first turned-on period for a second turned-on period; monitors a current flowing through the second switching element or the inductive storage element during the second turned-on period and terminates the second turned-on period after a change in the current direction of this current from a first current direction to an opposite second current direction has been detected.

Figure 1:
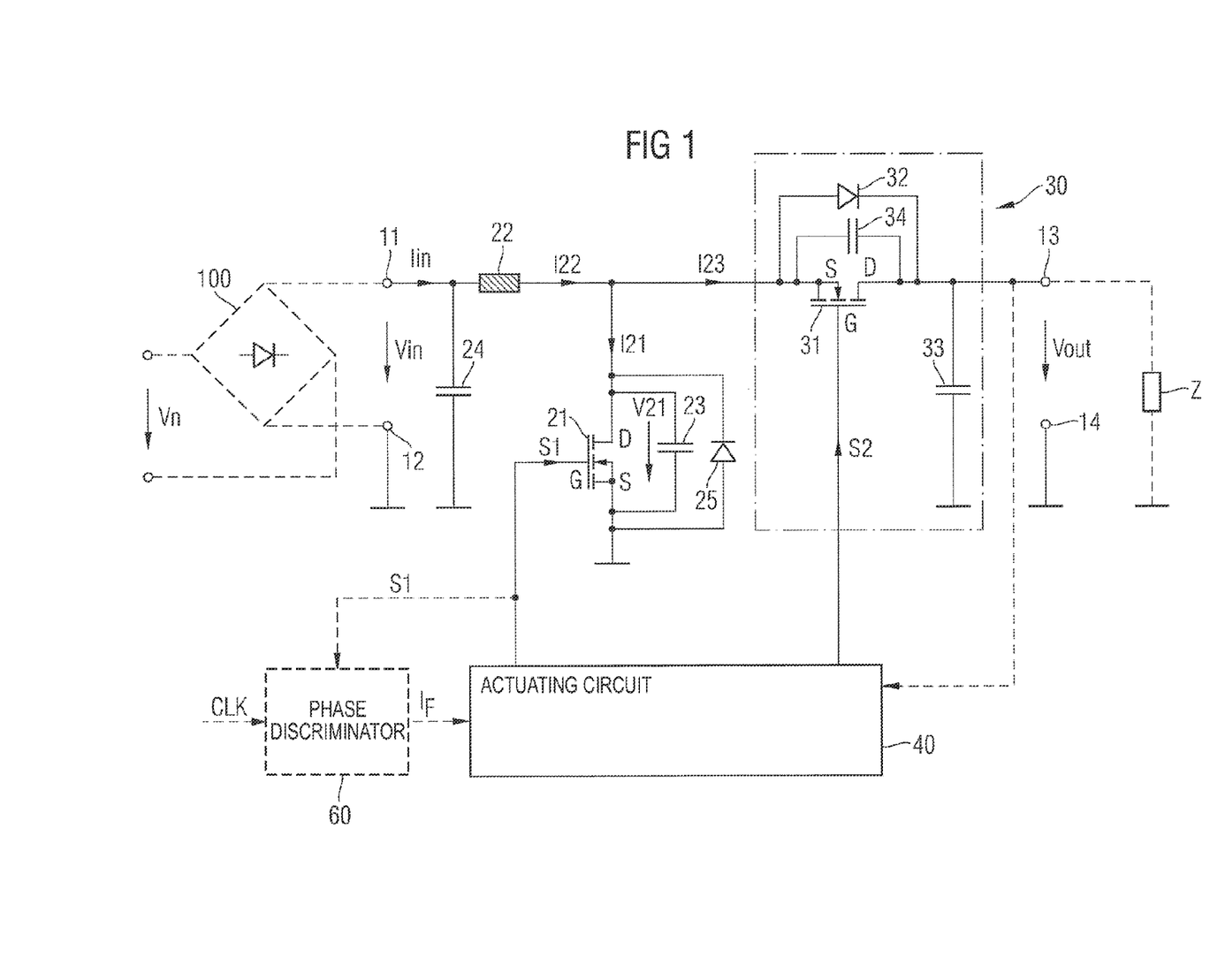
FIG. 1 illustrates one embodiment of a basic circuit for a step-up converter using an electrical equivalent circuit diagram.

FIG. 1 illustrates one embodiment of a step-up converter (boost converter) using an electrical equivalent circuit diagram. The step-up converter has input terminals 11, 12 for applying an input voltage Vin and output terminals 13, 14 for providing an output voltage Vout. In the embodiment illustrated, one 12 of the input terminals and one 14 of the output terminals are connected to a common electrical potential, such as ground. By way of example, the output voltage $V_{out}$ is used for supplying power to a load Z which can be connected to the output terminals 13, 14 (illustrated in dashes). In addition, the step-up converter has an inductive storage element 22 and a first switching element 21 for applying the input voltage Vin to the inductive storage element 22. In the example shown, the first switching element 21 is connected in series with the inductive storage element 22, wherein a series circuit containing the inductive storage element 22 and the first switching element 21 is connected between the input terminals 11, 12.

The inductive storage element 22 may be any inductive storage element for the inductive or magnetic storage of energy. The inductive storage element 22 may be a storage inductor having an inductor core (not illustrated). The first switching element 21 has a load path, which is connected in series with the inductive storage element 22, and a control connection for supplying a first actuation signal S1. In the embodiment illustrated, this switching element is in the form of a MOSFET. A drain-source path D-S in this MOSFET forms the load path, while a gate connection G in this MOSFET forms the control connection. In this embodiment, it should be pointed out that instead of a MOSFET it is naturally also possible to use any other switching elements, particularly semiconductor switching elements, such as IGBTs or bipolar transistors.

The first switching element 21 has a parasitic capacitance, which is illustrated in FIG. 1 and is denoted by the reference symbol 23, between its load path connections. In a MOSFET, this parasitic capacitance 23 is determined by the MOSFET's drain-source capacitance, but it is also dependent on the MOSFET's gate-drain capacitance.

The step-up converter has a rectifier arrangement 30 which is connected between the inductive storage element 22 and the output terminals 13, 14. In the embodiment illustrated, this rectifier arrangement 30 has a first capacitive storage element 33 which is connected between the output terminals 13, 14 and provides the output voltage Vout. This capacitive storage element 33 is in the form of a capacitor, for example, and is subsequently also referred to as the output capacitor of the step-up converter. The inductive storage element 22 and the output capacitor 33 have a second switching element 31 connected between them in the rectifier arrangement 30. This second switching element 31 has a load path connected between the inductive storage element 22 and the output capacitor 33 and has a control connection for supplying a second actuation signal S2. In the embodiment illustrated, the second switching element 31 is in the form of a MOSFET whose drain-source path forms the load path and whose gate connection forms the control connection. In this embodiment, it should be pointed out that instead of a MOSFET it is naturally possible to use any other switching elements, particularly semiconductor switching elements, such as IGBTs or bipolar transistors.

In the rectifier arrangement 30, the second switching element 31 performs the function of a first rectifier element when it is actuated in suitable fashion; such suitable actuation will be explained below. A second rectifier element 32, for example, a diode 32, may be connected in parallel with the load path of the second switching element 31. If the second switching element 31 is in the form of a MOSFET, this diode 32 may be the integrated body diode of the MOSFET. In the case of an n-channel MOSFET, this body diode is located in the forward direction between the source and drain of the MOSFET. In one embodiment, the second rectifier element 32 may be in the form of a separate diode, particularly in the form of a Schottky diode, which is connected in parallel with the load path of the switching element 31. When a MOSFET with an integrated body diode is used as the second switching element, this separate diode is then connected in parallel with the integrated body diode of the MOSFET.

For the purpose of the generating the first and second actuation signals S1, S2 for the first and second switching elements 21, 31, an actuating circuit 40 is provided, which is illustrated only schematically as a circuit block in FIG. 1. The way in which this actuating circuit 20 works will become clear from the following explanation of one embodiment for actuating the first and second switching elements 21, 31 or for generating the actuation signals S1, S2 for these first and second switching elements 21, 31. Such a method will be explained with reference to FIG. 2, which illustrates time profiles for the first actuation signal S1, the second actuation signal S2, a current I22 through the inductive storage element 22 and a voltage V21 across the first switching element 21.

Figure 2:
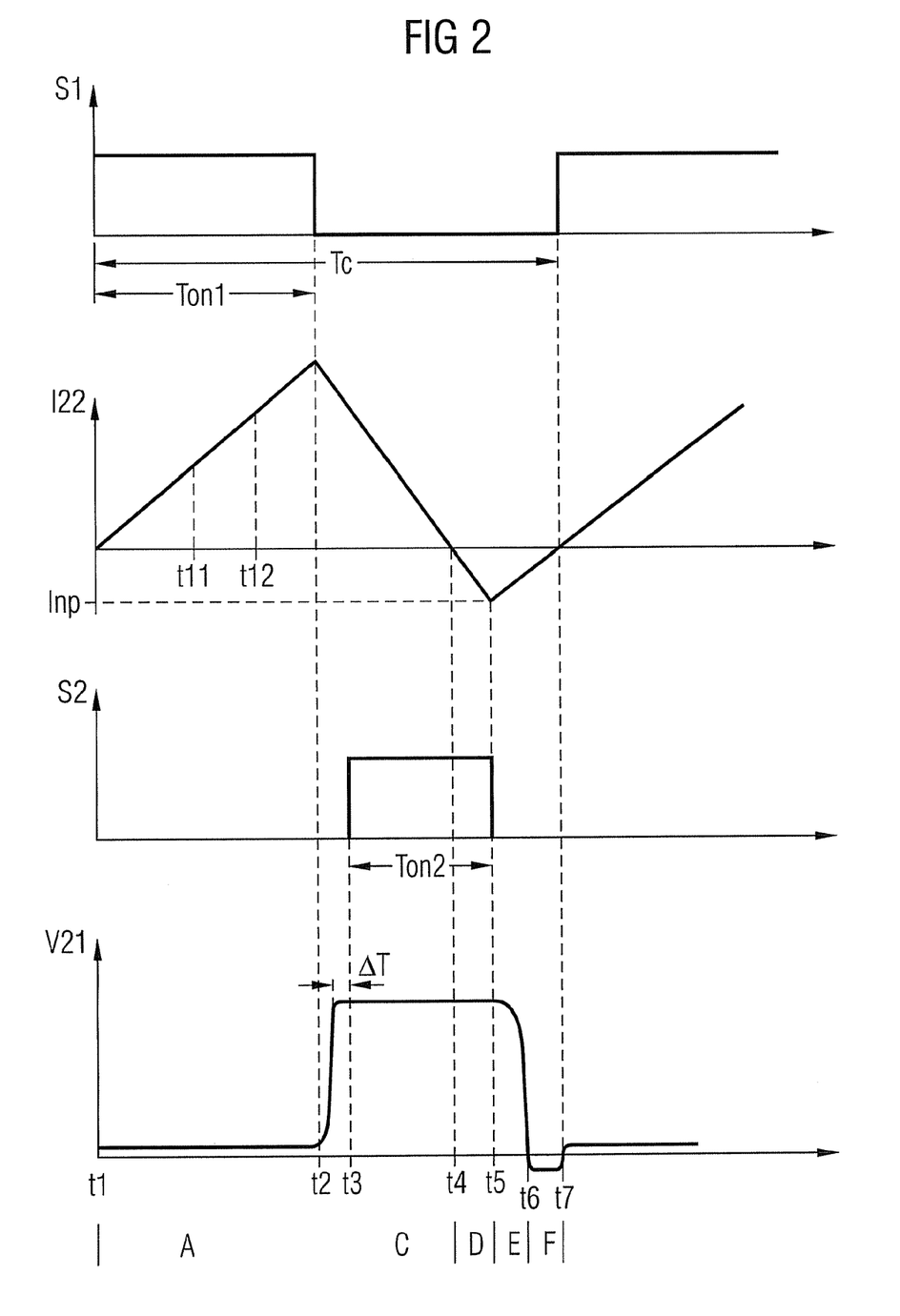
FIG. 2 illustrates one embodiment of time profiles for signals which occur in the step-up converter during an actuation cycle of an actuation method.

In the embodiment illustrated, the actuation signals S1, S2 are binary signals which can assume a turn-on level or a turn-off level. When the respective actuation signal is at a turn-on level, the switching element actuated by the actuation signal is on, and when the respective actuation signal is at a turned-off level, the switching element actuated by the actuation signal is off. For the purposes of the explanation, it will subsequently be assumed that an upper signal level (high level) of the respective actuation signal corresponds to a turn-on level and that a lower signal level (low level) of the respective actuation signal corresponds to a turn-off level.

The first and second switching elements 21, 31 are turned on and off cyclically, i.e. in basically the same way during successive actuation cycles. In this embodiment, during an actuation cycle, the first switching element 21 is turned on for a first turned-on period Ton1 and the second switching element 31 is turned on for a second turned-on period Ton2. The two switching elements 21, 31 are turned on at different times in order to avoid shorting the output capacitor 33. In one embodiment, an actuation cycle extends from when the first switching element 21 is turned on at the start of a first turned-on period Ton1 to when the first switching element 21 is turned on again at the start of a subsequent first turned-on period. In the embodiment illustrated in FIG. 2, such an actuation cycle extends from a time t1 to a time t7. The length of the turned-on cycle is Tc in this instance. If the first and second switching elements 21, 31 have a switching frequency fs, fs is equal to 1/Tc. This switching frequency is in the region of 100 kHz or above, for example.

In the case of the method explained with reference to FIG. 2, an actuation cycle can be divided into six different phases, which are subsequently denoted by A to F.

A first actuation phase A corresponds to the first turned-on period Ton1, during which the first switching element 21 has been turned on by the first actuation signal S1. The second switching element 31 is off during this first actuation phase A. Ignoring the voltage drop across the first switching element 21, which is on, approximately the entire input voltage Vin is thus across the inductive storage element 22 during the first actuation phase A. The current I22 through the inductive storage element 22 then rises. For a change dI22/dt in this current I22 over time, the following is then true:

$$\frac{dI22}{dt} = \frac{Vin}{L}. \qquad (1)$$

In this embodiment, Vin denotes the input voltage and L denotes the inductance of the inductive storage element 22. The slope of the current I22 is therefore proportional to the input voltage Vin and inversely proportional to the inductance of the inductive storage element 22. This relationship applies when the inductive storage element 22 does not become saturated or is not magnetized to the point of saturation during the first turned-on period Ton1, which is assumed from the explanation below. If the inductive storage element 22 were magnetized to the point of saturation, the current I22 would not—as illustrated—rise linearly. The present method also applies for those first turned-on periods Ton1 in which the inductive storage element becomes saturated; for the explanation which follows, however, linear time profiles are assumed.

The end of the first turned-on period Ton1 is reached at a time t2. At this time t2, a second actuation phase B begins, during which both switching elements 21, 31 are off. The current I22 flowing through the inductive storage element 22 is accepted by the second rectifier element 32, which is connected in parallel with the second switching element 31, during this second actuation phase B. The second actuation phase B ends at a time t3, from which the second switching element 22 is turned on for a second turned-on period Ton2 by using the second actuation signal S2. From this time, the current I22 flows through the second switching element 22 which, when in the on state, has lower on-state power losses than the second rectifier element 32—which is in the form of a diode, for example—or which has the same on-state power losses. The use of the second switching element 31 as a rectifier element serves to reduce the power loss arising in the step-up converter in comparison with the use of a conventional diode.

The first and/or the second switching element 21, 31 may be in the form of MOSFETs, in particular, which operate on the basis of the compensation principle. Such components, which are also called superjunction MOSFETs, basically have a low area-specific turn-on resistance, and hence low power loss. The power loss which arises in a MOSFET which is on, particularly a MOSFET operating on the basis of the compensation principle, is lower than the power loss which arises in a forward-biased diode which has the same dielectric strength as the MOSFET.

The second actuation phase B, during which both switching elements 21, 31 are off, is present merely for safety reasons and ensures that the first switching element 21 is safely off when the second switching element 31 is turned on. The length of this second actuation phase B is chosen, taking account of customary time delays for the first and second switching elements 21, 31, such that the first switching element 21 is safely off and the second switching element 31 is turned on.

At the end of the first turned-on period Ton1, that is to say when the first switching element 21 is disconnected, the voltage V21 across the load path of the first switching element 21 starts to rise. This voltage then rises up to a value which corresponds to the sum of the output voltage Vout and the voltage across the second switching element 31 or the second rectifier element 32. In this context, it should be noted that when a MOSFET with an integrated freewheeling diode is used as the first switching element 21, this MOSFET naturally needs to be connected up such that it is able to block such a voltage. When an n-channel MOSFET is used as the first switching element 21, the drain connection of this MOSFET needs to be connected to the inductive storage element 22.

In this embodiment, the length of the second actuation phase B can be chosen, on the basis of the time profile of the voltage V21, such that this actuation phase B ends after a delay time ΔT has elapsed, for example, after the voltage V21 has reached its maximum value or after this voltage V21 has reached a prescribed limit value. The rise in this voltage to the maximum value serves as an indication of the first switch S21 being off. The delay time ΔT is used for safety.

The by using the second switching element 31, which is on, may be negligible in comparison with the output voltage Vout, for example when the step-up converter are used to generate what is known as an intermediate-circuit voltage from a mains input voltage. Customary intermediate-circuit voltages for this situation are in the region of several 100 V, e.g., 400 V. By way of example, the voltage drop across a power MOSFET which is on is in the range from a few tenths of a volt to a maximum of a few volts and is negligible in comparison.

When the first switching element 21 is turned off at the end of the first actuation phase A, the current I22 through the inductive storage element 22 begins to fall. Provided that the inductive storage element 22 has not previously been magnetized as far as the range of saturation, the current I22 falls linearly. For a change dI22/dt in the current I22 over time, the following is true:

$$\frac{dI22}{dt} = \frac{Vin - Vout}{L}. \qquad (2)$$

A third actuation phase C starts at a time t3, at which the second switching element 31 is turned on by using the second actuation signal S2. During this third actuation phase C, the current I22 through the inductive storage element 22 flows further in the direction illustrated in FIG. 1, i.e. from the inductive storage element 22 via the second switching element 31 to the output capacitor 33 or the load Z. This current direction is subsequently referred to as the first current direction. The amplitude of the current I22 decreases in this embodiment on the basis of equation (2). The end of this third actuation phase C is reached at a time t4, at which the current through the inductive storage element 22 has fallen to zero, that is to say at which the inductive storage element 22 is fully demagnetized. The second switching element 31 remains on beyond this time t4. The current I22 through the inductive storage element 22 thereby changes its direction from the first current direction to an opposite second current direction, which is subsequently also referred to as the reverse direction. A current flowing through the inductive storage element in this direction is subsequently also referred to as a reverse current. This reverse current is supplied by the output capacitor 33.

At the time t4, at which the inductive storage element 22 is fully demagnetized, or at which the current I22 has its current direction reversed, a fourth actuation phase D starts. During this actuation phase D, electrical energy is stored in the inductive storage element 22, or the inductive storage element 22 is magnetized. This energy comes from the output capacitor 33. For a change in the current I22, the relationship according to equation (2) also applies during this fourth actuation phase D. Unlike in the third actuation phase C, the amplitude of the current I22 increases during this fourth actuation phase D, during which the current flows in the opposite direction in comparison with the third actuation phase D. During this fourth actuation phase D, a voltage across the first switching element 21 corresponds to the difference between the output voltage Vout and the voltage drop across the second switching element 31, which is on. The voltage V21 across the first switching element 21 changes from the third to the fourth actuation phase C, D merely by a value which is twice as high as the voltage drop across the second switching element 31, which is on, if it is assumed that the voltage drop is the same in both directions. Ignoring the voltage drop across the first switching element 21, which is on, in comparison with the output voltage Vout, there is no significant change in the voltage V21 across the first switching element 21 between the third and fourth actuation phases C, D, which has been assumed in the illustration illustrated in FIG. 2.

A flow of current through the inductive storage element 22 in the reverse direction is made possible by a second capacitive storage element 24, which is connected between the input terminals 11, 12. A second capacitive storage element 24 of this kind is required in cases in which it is not possible to feed a current back into the voltage source (not illustrated) which provides the input voltage Vin. By way of example, such current feedback is not possible when the input voltage Vin is provided by using a bridge rectifier 100 from an AC voltage Vn, for example a mains voltage, in a manner which is fundamentally known. The use of the second capacitive storage element 24 can be dispensed with if it is possible to feed a current back into the voltage source, or if the bridge rectifier 100 contains capacitive storage elements which are connected in parallel with the rectifier elements which the bridge rectifier contains.

To simplify illustration, the profile of the current I22 through the inductive storage element during the activation phase D is illustrated as a linear current profile. A linear current profile of this kind presupposes that the input capacitor 24 is not charged beyond the value of the input voltage Vin during the actuation phase D, so that the voltage across the inductive storage element 22 continues to correspond to the difference Vout-Vin between the output and the input voltage. In one embodiment, the capacitance of the input capacitor 24, for example, is of sufficient magnitude, taking into account the charge flowing to the input capacitor 24 during the phase D, for the voltage across the input capacitor 24 not to rise above the value of the input voltage Vin. Aside from that, although a rise in the voltage Vin during the phase D would result in a nonlinear profile for the current I22 during this phase, the fundamental way in which the method works, which has been explained, does not change as a result.

The fourth actuation phase D ends at a time t5, at which the second switching element 31 is turned off. In this embodiment, the first switching element 21 continues to remain off at first. At the start of a fifth actuation phase E, beginning at this time t5, the voltage V21 across the first switching element 21 first of all corresponds to the voltage during the fourth actuation phase D, that is to say approximately the output voltage Vout. This is dependent upon the parasitic capacitance 23, which has also been charged to this voltage at the time t5. During the fifth actuation phase E, the parasitic capacitance 23 is discharged by the current I22 which continues to flow in the reverse direction, so that the voltage V21 across the first switching element 21 falls to zero. In FIG. 2, t6 denotes a time at which the parasitic capacitance 23 has been discharged completely, or the voltage V21 across the first switching element 21 has fallen to zero. When the parasitic capacitance 23 has been discharged, a flow of current through the inductive storage element 22 in the reverse direction is made possible by a freewheeling element 25 which is connected in parallel with the load path of the first switching element 21. In the embodiment illustrated in FIG. 1, this freewheeling element is in the form of a diode. When a MOSFET is used as the first switching element 21, this diode 25 may be formed by the integrated body diode of the MOSFET.

During a sixth actuation phase F, which starts at the time t6 and during which the freewheeling element 25 accepts the current I22 from the inductive storage element 22, the voltage V21 across the first switching element 21 corresponds to the on-state voltage of the freewheeling element, which is approximately negligible in comparison with the output voltage Vout which was previously across the switching element 21, however. During the sixth actuation phase F, the polarity of the voltage across the first switching element 21 is opposite to the polarity during the other actuation phases.

The sixth actuation phase F, and hence the actuation cycle, ends at a time t7, at which the first switching element 21 is turned on again for a first turned-on period Ton1. The sixth actuation phase F, for example no later than when the current I22 through the inductive storage element 22 has fallen to zero. In the embodiment illustrated in FIG. 2, a time t7, at which the sixth actuation phase F ends, corresponds to this "zero-current time". If the sixth actuation phase F were to end later, free transformer oscillations could arise after the zero-voltage time, and these can be undesirable. In general, the time t7, at which the sixth actuation phase F ends and at which the first switching element is turned on again, can be chosen such that it is situated between the time t6 and the "zero-current time". By way of example, this time is ascertained using a limit value with which the current I22 is compared. The first switch S21 is turned on again whenever the magnitude of the current I22 has fallen to this prescribed threshold value, for example, the threshold value being able to be zero or not equal to zero.

During the fifth and sixth actuation phases E, F, the current I22 continues to flow in the reverse direction through the inductive storage element 22. An amplitude for this current decreases during these actuation phases, however.

To simplify illustration, the time profile of the current I22 in figure during the actuation phases E and F is illustrated as a linear time profile. In fact, the current does not have a linear profile during the fifth actuation phase E; however, the magnitude of the current I22 increases steadily during this phase—as illustrated. During the sixth phase F, the decrease in the current I22 has an approximately linear profile over time, with $dI22/dt \sim Vin/L$.

The method explained allows the first switching element 21 to be turned on at a time (t7 in FIG. 2) at which the voltage across this switching element 21 has fallen significantly in comparison with a voltage which is present at a time at which the inductive storage element 22 has been demagnetized for the first time (t4 in FIG. 2). In comparison with conventional methods, in which a switching element which is used for connecting an inductive storage element to an input voltage which was to be turned on again as soon as the inductive storage element has been demagnetized, the switching losses can be significantly reduced in the case of the method explained. If, with reference to FIGS. 1 and 2, the first switching element 21 were to be turned on again as early as the time t4 at which the inductive storage element has been demagnetized, the electrical energy previously stored in the parasitic capacitance 23 would be converted to heat in the first switching element 21, i.e. would contribute to the power loss. In the case of the method explained, the electrical energy stored in the parasitic capacitance 23 is by contrast fed back to the voltage source via the inductive storage element 22 or is buffer-stored in the input capacitor 24 until the first switching element 21 is next turned on.

In addition, the method explained avoids hard switching edges in a voltage V21 across the first switching element 21, since the first switching element 21 is not turned on until a time at which this voltage V21 has fallen to the value of the on-state voltage of the freewheeling element 25. If the first switching element were to be turned on again as early as the demagnetization time t4, this voltage V21 would fall very quickly from a high voltage value, which is in the region of the output voltage, to a low voltage value, which corresponds to the voltage drop across the component which is on. This could result in EMC problems. In this embodiment, it should be noted that the switching, particularly the disconnection, of the second switching element is rather uncritical in terms of EMC problems in the method explained, since the voltage across the second switching element 31 upon disconnection at the end of phase D is small.

The method explained ensures complete discharge of the parasitic capacitance 23 of the first switching element 21 particularly when the energy stored in the inductive storage element 22 during the fourth actuation phase D corresponds, at a time t5, when the reverse current I22 reaches its maximum value, at least to the electrical energy stored in the parasitic capacitance 23 at this time t5, that is to say when the following is true:

$$\frac{1}{2} \cdot L \cdot Ipn^2 \approx \frac{1}{2} \cdot C_{23} \cdot Vout^2. \tag{3}$$

In this embodiment, Ipn denotes the maximum amplitude of the current I22 during the fourth actuation phase D, which is subsequently also referred to as the peak reverse recovery current, L denotes the inductance of the inductive storage element, $C_{23}$ denotes the capacitance value of the parasitic capacitance 23 and Vout denotes the output voltage. The estimate made on the basis of equation (3) in this instance is based on the assumption that the voltage across the first switching element 21 during the fourth actuation phase D corresponds approximately to the output voltage Vout; the energy stored in the parasitic capacitance 23 at a time t5 therefore corresponds approximately to the term indicated on the right in equation (3).

The relationship explained with reference to equation (3) is based on the simplistic assumption that the capacitance value $C_{23}$ of the parasitic capacitance 23 is independent of the voltage across the first semiconductor switching element 21 and that the capacitance value of a parasitic capacitance 34 of the second semiconductor switching element 31, which capacitance is present in parallel with the load path of the second semiconductor switching element 31, is zero. As already explained, the two semiconductor switching elements 21, 31 may be in the form of compensating components, in particular. The parasitic capacitance or output capacitance of such compensating components is dependent on the voltage across the load path of the component and decreases as the voltage increases.

Figure 10:
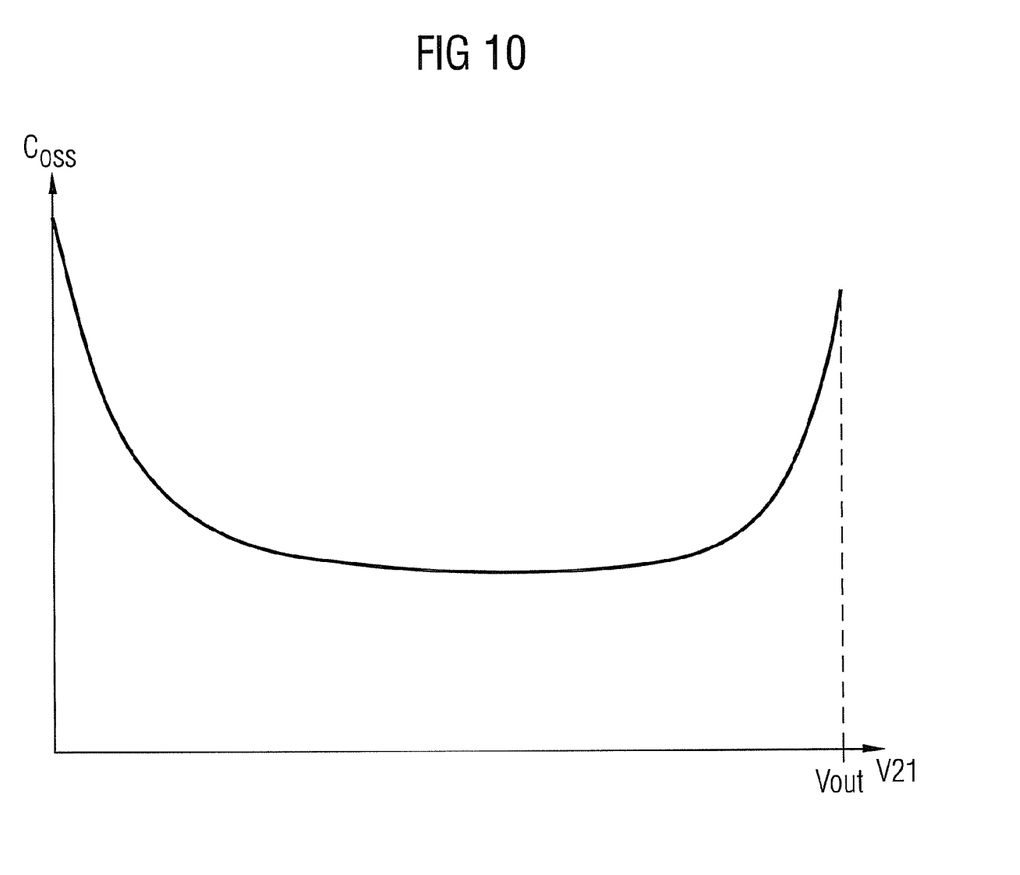
FIG. 10 illustrates the profile of an effective capacitance which is present when compensating components are used as switching elements.

FIG. 10 schematically illustrates the profile of the capacitance value $C_{oss}$ of an effective capacitance which is active at the circuit node which is common to the first and second semiconductor switching elements 21, 31. This effective capacitance is made up of the capacitance values of the voltage-dependent output capacitances 23, 31 of the first and second semiconductor switching elements 21, 31, and in FIG. 10 is plotted as a function of the voltage V21 across the first semiconductor switching element 21. At small voltage values for this voltage V21, the capacitance value of this capacitance is definitively determined by the output capacitance 23 of the first semiconductor switching element 21, which output capacitance has its maximum value at a voltage V21 of zero. Accordingly, the capacitance value of this effective capacitance at large voltage values of the voltage V21 is definitively determined by the output capacitance 34 of the second semiconductor switching element 31. This output capacitance assumes its maximum value when the voltage across the second semiconductor switching element 31 is zero, that is to say when the voltage V21 across the first semiconductor switching element 21 corresponds to the output voltage Vout. A minimum for the capacitance value of this effective capacitance is at a voltage V21 between zero and the output voltage Vout.

When considering output capacitances 23, 34 with voltage-dependent capacitance values, the electrical energy $E_{ind}$ stored in the inductive storage element 22 during the flow of current in the reverse direction must satisfy the following condition:

$$E_{ind} = \int_0^{Vout} C_{oss} \cdot U dU \tag{3a}$$

in this embodiment, $C_{oss}$ denotes the voltage-dependent effective capacitance.

To ensure complete discharge of the parasitic capacitance 23, one embodiment has provision for calculation of a minimum necessary peak reverse recovery current value for complete discharge of the parasitic capacitance 23, which is subsequently referred to as $Ipn_{min}$, and for the second turned-on period Ton2 to be respectively terminated when the current I22 flowing in the second current direction reaches this peak value $Ipn_{min}$, that is to say when $Ipn_{min}=I22$ is true. With reference to equation (3), the following is approximately true for this minimum peak reverse recovery current value or threshold value Ipn of the current I22, at which the second switching element 31 is supposed to be disconnected:

$$Ipn_{min} \approx \sqrt{\frac{C_{23}}{L}} \cdot Vout. \tag{4}$$

When compensating components are used as switching elements, this equation needs to be adapted as appropriate taking into account equation (3a).

This peak reverse recovery current value $Ipn_{min}$ is therefore dependent on the capacitance value $C_{23}$ of the parasitic capacitance 23 and the inductance L of the inductive storage element 22, which are fixed variables, and on the output voltage Vout. The output voltage Vout is a variable which is controlled by the step-up converter and which is supposed to be kept at least approximately constant regardless of a connected load Z. The minimum peak reverse recovery current value $Ipn_{min}$ may therefore be stored as a constant variable in the actuating circuit 40. In this embodiment, the actuating circuit 40 is designed to turn off the second semiconductor switching element 31 each time the current I22 in the reverse direction has respectively risen to this threshold value $Ipn_{min}$. It should be noted that the peak reverse recovery current value calculated on the basis of equation (4) represents the minimum value which the reverse current should reach in order to achieve complete discharge of the parasitic capacitance. It goes without saying that the second switching element 31 may also be disconnected only when the reverse current has risen above the value based on equation (4). In the text below, Ipn generally denotes the peak reverse recovery current value, at which the second switching element is disconnected. To achieve complete discharge, this value should be greater than or equal to the value $Ipn_{min}$ defined in equation (4).

In one embodiment, it is possible to store information about the capacitance value $C_{23}$ of the parasitic capacitance 23 and the inductance value L of the inductive storage element 22 in the actuating circuit 40 and to measure the output voltage Vout or the voltage V21 across the semiconductor switching element 21 and to calculate the threshold value Ipn in the actuating circuit 40 in line with equation (4). The actuating circuit 40 may be programmable (in a manner which is not illustrated in more detail), so that the information required for calculating the threshold value Ipn can be programmed externally. This allows use of the actuating circuit 40 in step-up converters with different dimensional specifications, i.e. with different inductances and parasitic capacitances.

In the method explained, regulation of the output voltage Vout to a value which is at least approximately independent of a power consumption by the load Z is effected using the first turned-on period Ton1 of the first switching element 21, for example. The step-up converter's power consumed on average via the input terminals 11, 12 needs to be matched to the output power consumed by the load Z via the output terminals 13, 14, in order to keep the output voltage Vout constant. The average power consumption of the step-up converter is directly dependent on the first turned-on period Ton1, which means that the output voltage Vout can be regulated to a constant value using the first turned-on period Ton1. If the load Z has a high power consumption, the first turned-on period Ton1 is set to a high value in order to keep the output voltage Vout constant. If the load Z has only a low power consumption, the first turned-on period Ton1 is set to a low value in order to keep the output voltage Vout constant. To adjust this first turned-on period Ton1, a control signal is provided which is dependent on a power consumption by the load at present or on a time profile of the output voltage Vout in the past. This control signal is used to set the first turned-on period Ton1.

Figure 3:
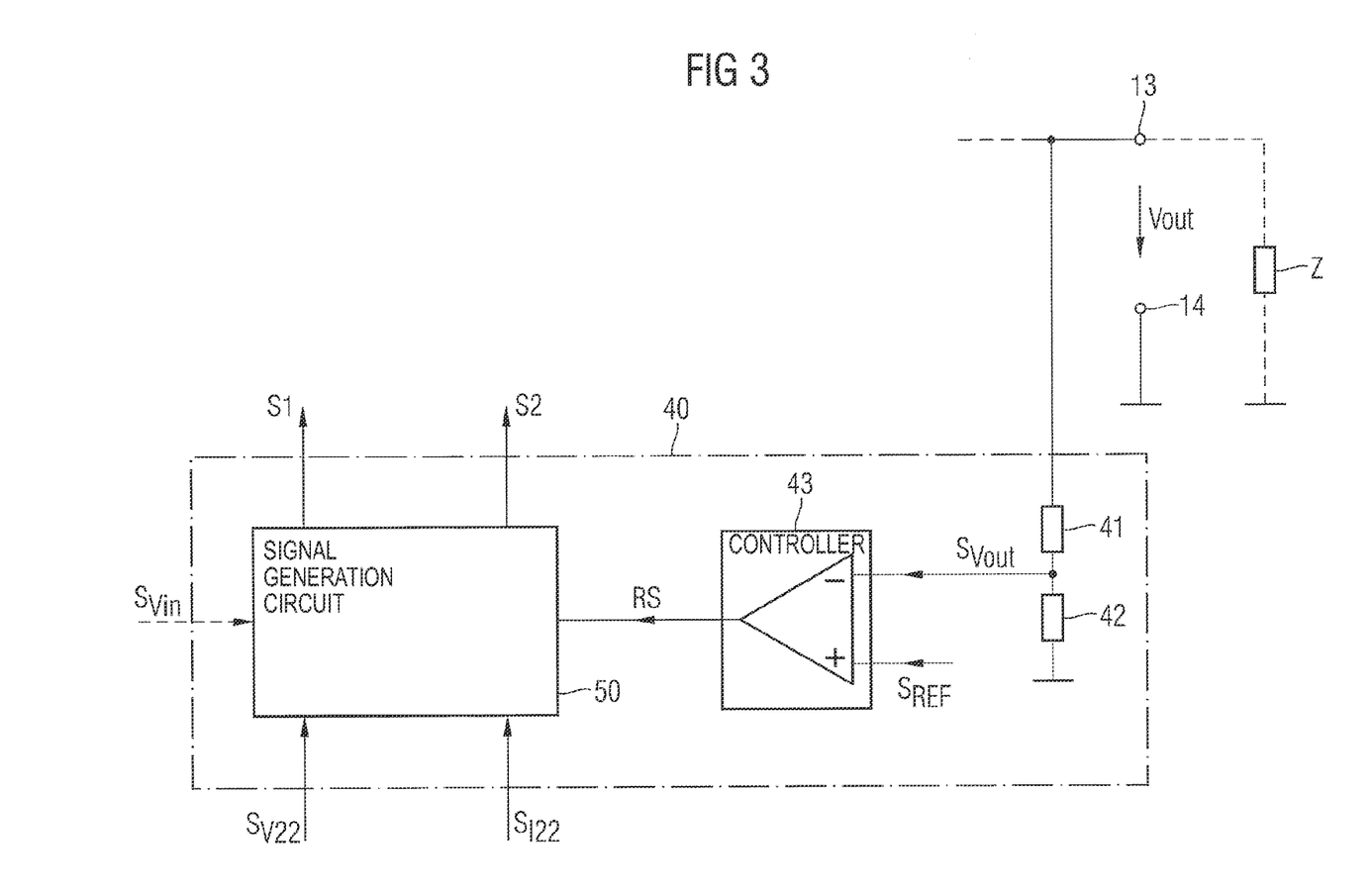
FIG. 3 illustrates one embodiment of an actuating circuit in a step-up converter.

FIG. 3 illustrates one embodiment for generating such a control signal RS. In the embodiment illustrated, the control signal RS is available at the output of a controller 43, which may have a proportional control response (P response), an integral control response (I response) or a proportional integral response (PI response). This controller 43 is supplied with a measurement signal $Sv_{out}$ which is proportional to the output voltage Vout and which—as illustrated—is generated from the output voltage Vout using a voltage divider 41, 42, for example. The controller 43 is also supplied with a reference signal $S_{REF}$ which represents a setpoint variable to which the output voltage Vout needs to be regulated. The controller 43 uses the measurement signal $S_{vout}$ and the reference signal $S_{REF}$ to ascertain a control error and generate the control signal RS taking this control error into account. The control signal RS represents—depending on the control response of the controller 43—a present and/or past error in the output voltage Vout from the setpoint value represented by the reference signal $S_{REF}$ and thus represents a power consumption by the load Z. By way of example, this control signal RS is generated such that its value increases as the power consumption of the load Z increases.

The controller 43 may be any controller which has the desired control response. In particular, the controller 43 may be an analog controller or else a digital controller. The control signal RS available at the output of the controller 43 is supplied to a signal generation circuit 50 which, like the controller 43, is part of the actuating circuit 40 and which generates the first and second actuation signals S1, S2.

Figure 4:
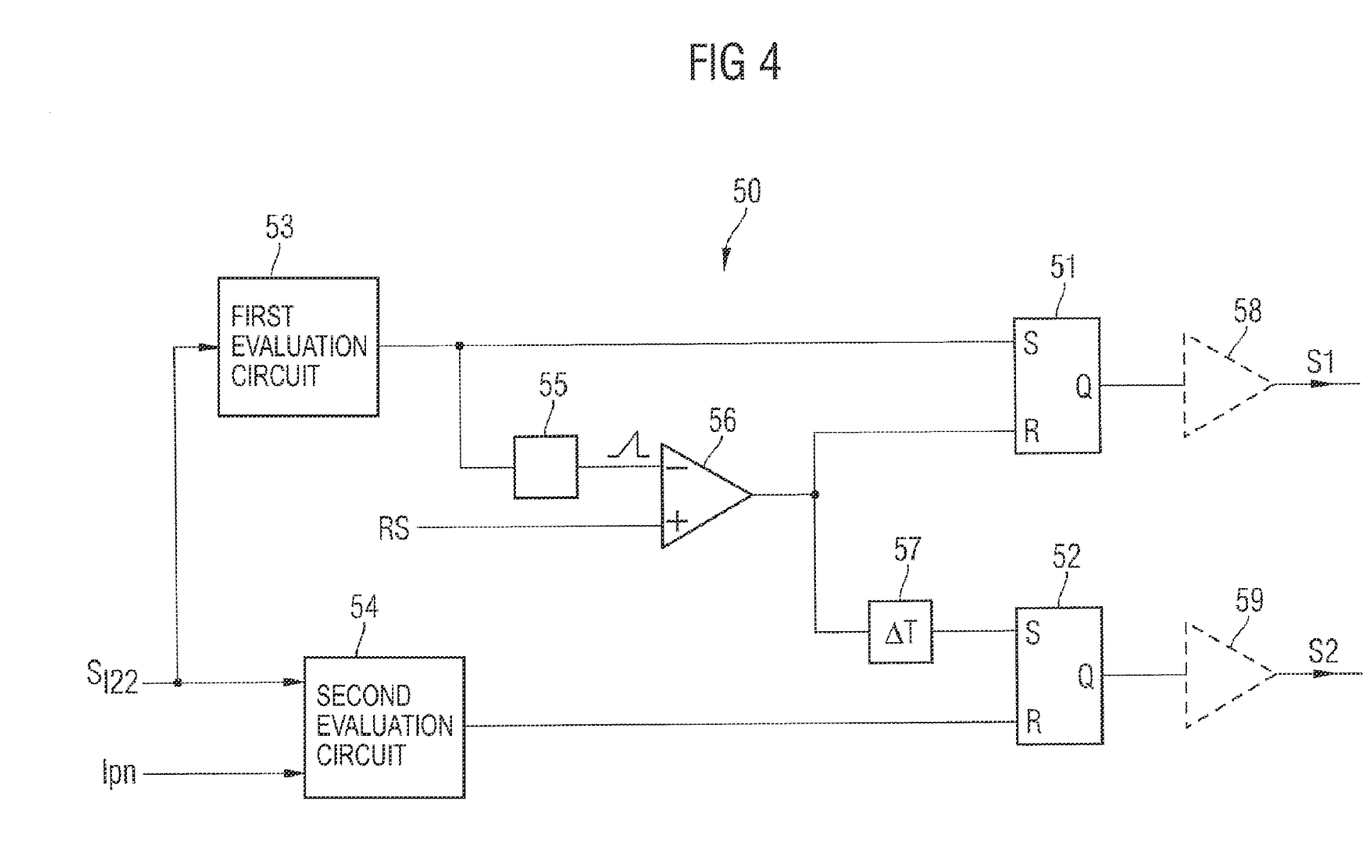
FIG. 4 illustrates one embodiment of a signal generation circuit which is present in the actuating circuit.

An example of such a signal generation circuit 50 is illustrated in FIG. 4. This signal generation circuit has first and second flipflops 51, 52 which are in the form of RS-type flipflops in the embodiment illustrated and which each have a Set input S, a Reset input R and a noninverting output Q. The output Q of the first flipflop 51 provides the first actuation signal S1, and the output of the second flipflop 52 provides the second actuation signal S2. Optionally, the flipflops 51, 52 have downstream driver circuits 58, 59 which serve to convert signal levels for the logic signals available at the outputs of the flipflops 51, 52 to signal levels which are suitable for actuating the first and second switching elements 21, 31. For the purposes of explanation, it will be assumed that turn-on levels of the actuation signals S1, S2 are present each time the flipflops 51, 52 have been set, and that turn-off levels of the actuation signals S1, S2 are present when the flipflops 51, 52 have been reset.

To set the first flipflop 51, and hence to stipulate the start of a first turn-on period Ton1, a first evaluation circuit 52 is provided which, in the example, is supplied with a current measurement signal $S_{I22}$. This current measurement signal $S_{I22}$ is dependent on the current I22 flowing through the inductive storage element 22. In particular, this current measurement signal $S_{I22}$ is proportional to this current and can be generated by using any current measuring arrangement, which is not illustrated in more detail in FIG. 1. The first evaluation circuit 53 is designed to evaluate this current measurement signal $S_{I22}$ and to set the flipflop 51 if a turn-on criterion for the first switching element 21 is met. With reference to FIG. 2, this turn-on criterion is met, for example, when the current I22 has reached a prescribed turn-on threshold value. A signal for resetting the first flipflop 51, and hence for terminating the first turned-on period Ton1, is generated by a comparator 56 in the embodiment illustrated, the comparator comparing a signal generated by a triangular-waveform signal generator or sawtooth generator 55 with the control signal RS. The signal generator 55 is actuated by the first evaluation circuit 53 and generates a triangular-waveform signal each time the first flipflop 51 is set. The flipflop 51 is reset each time the triangular-waveform signal has risen to the value of the control signal RS. This period of time directly determines the first turned-on period Ton1 and, in the embodiment illustrated, is longer the larger the control signal RS.

In the signal generation circuit 50 illustrated, a turn-on level for the second actuation signal S2 is generated when a delay time has elapsed after the first flipflop 51 has been reset. In one embodiment, the output signal from the comparator 56 is supplied to the Set input S of the second flipflop 52 via a delay element 57. In this embodiment, a delay time prescribed by the delay element 57 determines the time delay between resetting the first flipflop, i.e. the end of the first turned-on period Ton1, and setting the second flipflop 52, i.e. the start of the second turn-on period Ton2.

To reset the second flipflop 52, i.e. to terminate the second turned-on period Ton2, a second evaluation circuit 54 is provided which is supplied with the current measurement signal $S_{I22}$ and with the threshold value Ipn. In this embodiment, the second flipflop 52 is reset by the second evaluation circuit 54 each time the current measurement signal $S_{I22}$ indicates that the current I22 is flowing through the inductive storage element 22 in the second current direction and has reached the threshold value Ipn.

It should be pointed out that instead of a single current measurement signal $S_{I22}$ it would also be possible for two current measurement signals to be provided, namely a first current measurement signal, which represents the current in the first switching element 21 of the freewheeling element 25 connected in parallel therewith and which is supplied to the first output value circuit 53, and a second current measurement signal, which represents the current through the second switching element 31 and which is supplied to the second evaluation circuit 54. It should also be pointed out that FIG. 4 is meant to explain only the fundamental manner of operation of an example of the signal generation circuit 50. It goes without saying that the circuit components illustrated in FIG. 4 may be in the form of analog or digital circuit components.

Instead of ascertaining the disconnection time (t5 in FIG. 2) of the second switching element 31 by comparing the current I22 with a threshold value which corresponds to the desired peak reverse recovery current value, a further example has provision for the disconnection time t5 to be stipulated by taking the disconnection time t2 of the first switching element 21 as a basis for calculating the period of time within which the current direction of the current I22 is reversed and within which the amplitude of the current I22 in the second current direction reaches the desired peak reverse recovery current value Ipn. With reference to FIG. 2, this period of time corresponds to the sum of the delay time ΔT and the second turned-on period Ton2 or the period of time between the times t2 and t5. The following is true for this period of time:

$$Tdel = \frac{\frac{Vin}{L} \cdot Ton1 + Ipn}{\frac{Vout - Vin}{L}} = \frac{Vin}{Vout - Vin} Ton1 + \frac{Ipn \cdot L}{Vout - Vin}. \quad (5)$$

Figure 5:
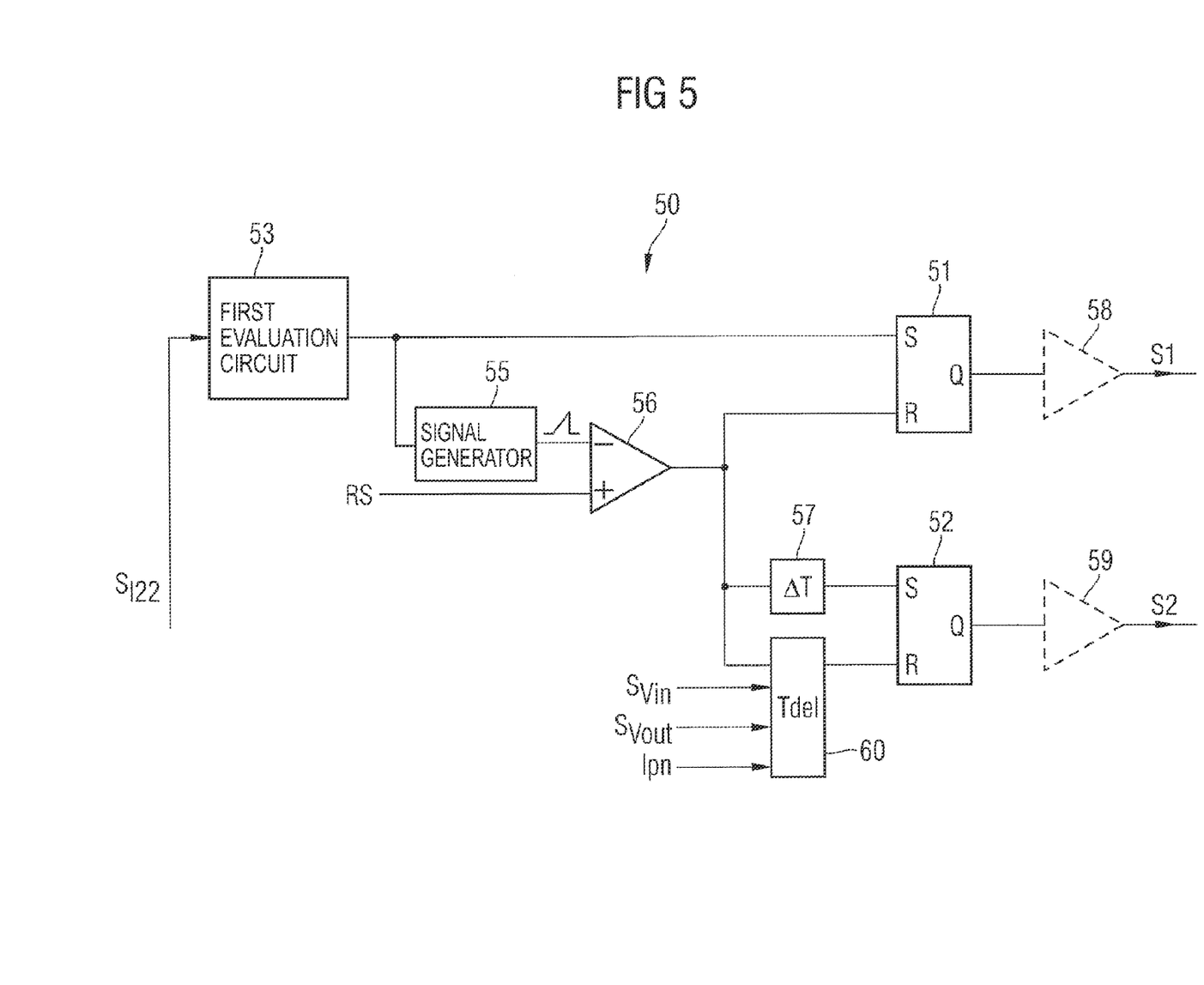
FIG. 5 illustrates one embodiment of a signal generation circuit which is present in the actuating circuit.

In this embodiment, Tdel denotes the delay time between the first switching element 21 being turned off and the second switching element 31 being turned off later. With reference to FIG. 5, this delay time Tdel can be calculated from the input voltage Vin, the output voltage Vout, the first turned-on period Ton1 and the desired peak reverse recovery current value Ipn of the current I22.

An example of a signal generation circuit 50 which actuates the first and second switching elements 21, 31 in this manner is illustrated in FIG. 5. This signal generation circuit 50 differs from the one illustrated in FIG. 4 in that a second evaluation circuit 60, which resets the second flipflop 52, is supplied with the reset signal from the first flipflop 51. This reset signal determines the disconnection time t2 of the first switching element 21. The second evaluation circuit 60 takes account of equation (5) to calculate the delay time Tdel before the second switching element 31 is turned off from this time. In one embodiment, the second evaluation circuit 60 is supplied with an input voltage signal $S_{Vin}$, an output voltage signal $S_{Vout}$, the peak value signal Ipn and a turned-on period signal $S_{Ton1}$. The input voltage signal $S_{Vin}$ contains information about the input voltage Vin, the output voltage signal $S_{Vout}$ contains information about the output voltage Vout, and the first turned-on period signal $S_{Ton1}$ contains information about the first turned-on period Ton1. The output voltage signal $S_{Vout}$ can be ascertained by measuring the output voltage Vout, this not being illustrated in more detail.

Taking account of the fact that the output voltage Vout is always adjusted to a setpoint value, and hence is at least approximately constant, the output voltage signal $S_{Vout}$ may also be permanently stored in the actuating circuit or the signal generation circuit 50. Information about the inductance L, which is likewise needed for calculating the delay time Tdel, is permanently stored in the second evaluation circuit 60, for example. The second evaluation circuit 60 may be programmable in this instance (this is not illustrated in more detail), which means that the information about the inductance L can be set or programmed externally.

The input voltage Vin can be measured (not illustrated in more detail) in order to ascertain the input voltage signal $S_{Vin}$. In addition, it is also possible to ascertain the input voltage Vin by measuring the current I22 at two different times during the first turned-on period Ton1 and calculating the input voltage Vin using knowledge of the inductance and the time interval between the two measurement points. In this context, the following is true:

$$Vin = (I22(t12) - I22(t11)) \cdot L \quad (6).$$

In this embodiment, I22(t12) and I22(t11) denote the value of the current I22 at the measurement times t12 and t11, the measurement time t12 coming after the measurement time t11. The measurement times are illustrated by way of example in FIG. 2 to aid understanding.

It goes without saying that it is also possible to ascertain the input voltage Vin by measuring the current I22 at two measurement times which are apart in time during the falling edge of the current, that is to say during the second turned-on period Ton2.

The step-up converter explained is particularly suitable for converting an input voltage Vin into an output voltage Vout which is a rectified mains voltage Vn. In the case of a sinusoidal mains voltage Vn at a frequency of 50 Hz or 60 Hz, the input voltage Vin is a voltage in the form of the magnitude of a sine wave at a frequency of 100 or 120 Hz. In this embodiment, the input voltage Vin varies over time. However, the frequency of the input voltage Vin is low in comparison with switching frequencies at which the first and second switching elements 21, 31 are actuated. By way of example, these switching frequencies are in the region of 100 kHz, and above. In particular, the switching frequencies are in the range between 100 kHz and 250 kHz, for example. The input voltage Vin may be assumed to be approximately constant in this embodiment, at least for the duration of an actuation cycle, so that the previous statements are also valid for an input voltage Vin which result from a mains AC voltage Vn through rectification.

Step-up converters which are used for converting an input voltage Vin resulting from a mains voltage Vn in many cases have the requirement that an average current consumption by the step-up converter needs to be proportional to the input voltage Vin. The power consumption is then proportional to the square of the input voltage. This reduces reactive power absorption from the mains. Step-up converters which ensure such proportionality between the input voltage Vin and the average value of the input current are also called power factor correction circuits (power factor controllers, PFC). It is basic knowledge that such proportionality between the input voltage and the average value of an input current, which is denoted by Iin in FIG. 1, can be achieved for a step-up converter by virtue of the switching element which connects the inductive storage element to the input voltage being turned on for constant turned-on periods in each case, and is turned on again as soon as the inductive storage element is completely demagnetized. In the case of step-up converters in which it is not turned on again immediately after complete demagnetization of the inductive storage element, such proportionality between the input voltage and the average value of the input current can be achieved by virtue of a waiting time between complete demagnetization of the inductive storage element and the switching element's being turned on again being proportional to the period of time between the switching element's being turned on and complete demagnetization of the inductive storage element.

In the case of the actuation method explained with reference to FIG. 2, such proportionality between the input voltage Vin and the input current Iin can be achieved by virtue of, with reference to FIG. 2, the period of time between the time t4 at which the inductive storage element 22 is completely demagnetized and the time t7 at which the first switching element 21 is turned on again being proportional to the period of time between the turn-on time t1 and the time t4. This can be achieved at least approximately by virtue of the peak reverse recovery current value Inp, at which the disconnection time t5 of the second switching element 31 is reached, being set proportionally to the instantaneous value of the input voltage Vin, provided that the profile of the current between the times t4 and t7 as well as between the times t1 and t4 is triangular at least approximately or at least over wide ranges of the time interval.

In one embodiment, the input voltage Vin can be measured directly, or the input voltage can be ascertained by measuring the current I22 at two different measurement times taking account of the inductance L of the inductive storage element 22. Setting the threshold value Inp in proportion to the input voltage Vin is a compromise between reducing the power loss and the power factor correction. This is because with small instantaneous values of the input voltage Vin the stored in the inductive storage element 22 during the fourth actuation phase D may not be sufficient to discharge the capacitive storage element 23 completely, i.e. a peak reverse recovery current value Ipn which is set in this manner is smaller than $Ipn_{min}$ for small input voltages.

Figure 6:
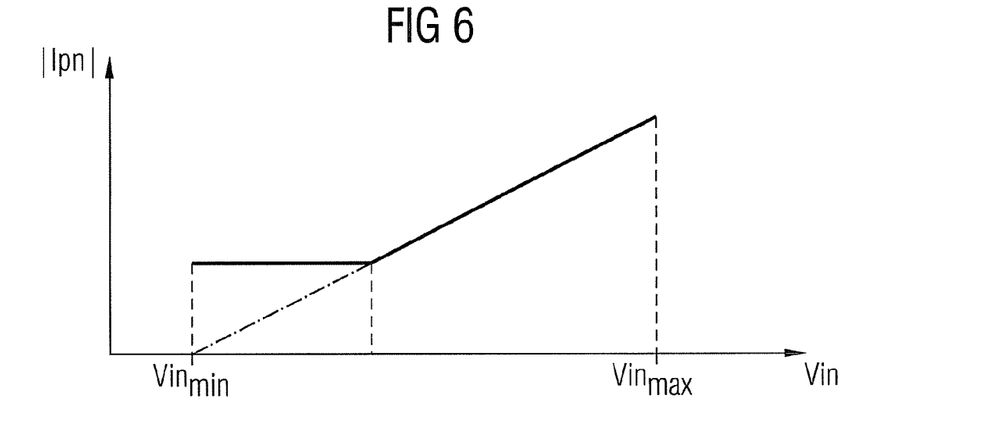
FIG. 6 illustrates a peak reverse recovery current value dependency on an input voltage for an example of an actuation method.

Alternatively, it is possible to set the threshold value Inp for large input voltages Vin in proportion to the input voltage Vin and to set to a constant value for small input voltages, the constant value being chosen such that the energy stored in the inductive storage element 22 during the fourth actuation phase D is sufficient to discharge the capacitive storage element 23 completely. FIG. 6 illustrates an example of such dependency of the peak reverse recovery current value Ipn on the input voltage Vin. In this embodiment, two ranges of values are defined for the input voltage Vin: a first range of values, which extends from a minimum value $Vin_{min}$, for example zero, for the input voltage Vin to a first limit value $Vin_0$, and a second range of values, which extends from the first limit value $Vin_0$ to a maximum possible instantaneous value $Vin_{max}$ of the input voltage. For input voltages Vin within the first range of values, the peak reverse recovery current value Ipn is firmly prescribed and, for example, corresponds to the value $Ipn_{min}$ which is at least necessary for complete discharge of the parasitic capacitance 23. For input voltages Vin within the second range of values, the peak reverse recovery current value Ipn is proportional to the input voltage Vin. In the case of such a process, the parasitic capacitance 23 is discharged completely during all fluctuation cycles. Optimum power factor correction is achieved only for input voltages within the second range of values, however. In a dash-dot line, FIG. 6 also illustrates the dependency of the peak reverse recovery current value on the input voltage Vin for the case in which the peak reverse recovery current value Ipn is proportional to the input voltage for all instantaneous values of the input voltage.

Figure 7:
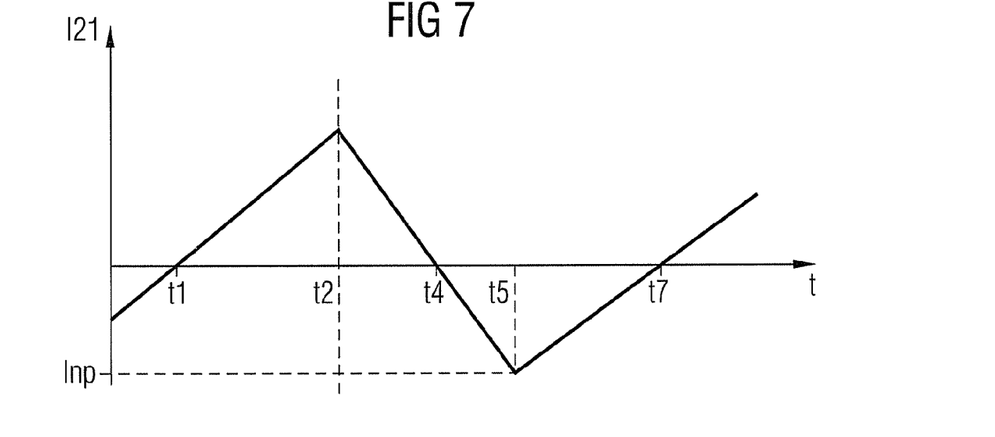
FIG. 7 illustrates one embodiment of time profiles for signals occurring in the step-up converter during an actuation cycle.

In another embodiment, provision is made for the peak reverse recovery current value Inp to be set on the basis of the control signal RS and for the magnitude of the threshold value Inp to be increased if the control signal RS indicates a low power consumption by the connected load Z. FIG. 7 illustrates the time profile of the current I22 for such a scenario, in which the threshold value Inp has been shifted toward greater values in comparison with the embodiment illustrated in FIG. 2. Such variation in the threshold value Inp allows the power consumption of the step-up converter to be varied given the same first turned-on period Ton1. That is to say that when the amplitude of the threshold value Inp is increased the power consumption is reduced given the same turned-on period Ton1. By increasing the threshold value Inp, it is therefore possible to reduce the power consumption without increasing the switching frequency. In an extreme case in which the magnitude of the threshold value Inp corresponds to the maximum value which the current I22 reaches during the first actuation phase A, the power consumption of the step-up converter is even zero on average. Provided that no bridge rectifier is present, the electrical power consumed previously via the input terminals 11, 12 can be fed back into the input voltage source completely. Even a negative average power consumption can be set. In this embodiment, more electrical energy is drained via the input terminals 11, 12 per actuation cycle than is picked up via them. Over several actuation cycles, this results in the output capacitor 33 being discharged.

Figure 8:
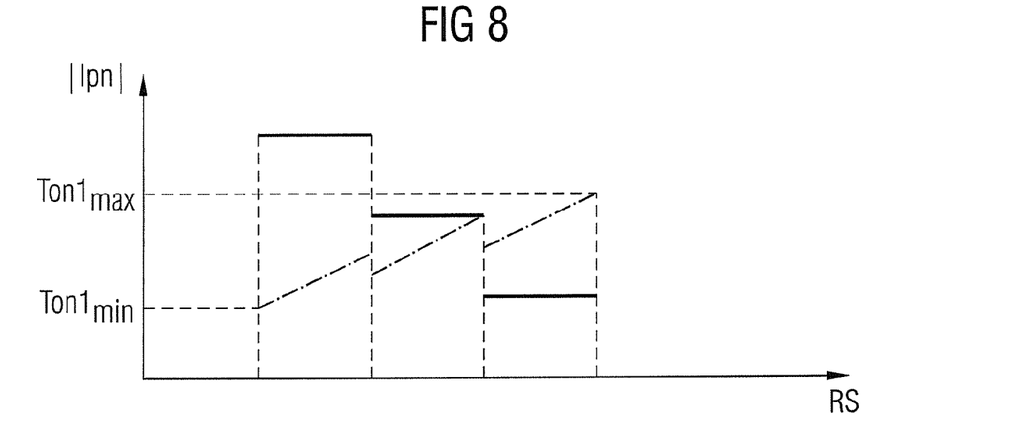
FIG. 8 illustrates a peak reverse recovery current value dependency on a control signal for an example of an actuation method.

In this embodiment, the peak reverse recovery current value may have been chosen, in particular, so that it assumes the same respective values for individual values in a range of values for the control signal, as illustrated in FIG. 8. In the embodiment illustrated in FIG. 8, one possible range of values for the control signal has been divided into three ranges for which the peak reverse recovery current value Inp has the same respective values, with the magnitude of the peak reverse recovery current value Ipn becoming greater for control signal values which indicate a low power consumption by the load—these are small control signal values in FIG. 7. Within the individual ranges, the power consumption by the load is controlled by the first turned-on period Ton1. This turned-on period, which is illustrated as a dash-dot line in FIG. 8, increases as power consumption increases, i.e. in the example as the control signal RS becomes larger. Since the power consumption is also determined by the peak reverse recovery current value in addition to the first turned-on period in the method explained, the same first turned-on periods Ton1 may be obtained for different ranges of values. Overall, this allows the first turned-on period to be limited to a range of values from $Ton1_{min}$ to $Ton1_{max}$, which is smaller than without variation of the peak reverse recovery current value Ipn on the basis of the control signal. In this embodiment, appropriate limiting is obtained for a frequency range of the switching frequency.

In the embodiment illustrated in FIG. 8, the smallest of the possible peak reverse recovery current values is chosen, in particular, such that it is less than or equal to $Ipn_{min}$. If a time-variant input voltage Vin is present, the peak reverse recovery current value can be set either on the basis of the input voltage Vin or on the basis of the control signal.

Referring to the statements made up to this juncture, the duration of the sixth actuation phase F, that is to say the period of time between the first V21 falling to zero and the first switch S21 being turned on again, may be variable, this period of time being set, in particular, such that it ends before the current I22 through the inductive storage element 22 has fallen to zero. In one example, provision is made for the frequency and/or the phase of the first and second actuation signals S1, S2 to be set using the duration of this sixth actuation period F.

As explained, the end of the sixth actuation phase F can be ascertained by comparing the current I22 with a reference value, the end of the sixth actuation period F having been reached in this embodiment when the magnitude of the current I22 has fallen to this reference value, which is subsequently referred to as $I_F$. In the example of a signal generation circuit which was explained with reference to FIG. 4, this evaluation of the current I22 takes place in the first evaluation circuit.

In this embodiment, the duration of the sixth actuation period F—and hence the frequency and phase of the first and second actuation signals S1, S2—can be set using this reference value $I_F$. By way of example, this reference signal $I_F$ is supplied to the actuating circuit 40, as illustrated in dashes in FIG. 1.

In one embodiment, provision is made for the duration of the sixth actuation phase F to be set on the basis of a phase difference between one of the two actuation signals S1, S2 and a reference clock signal, specifically with the aim of generating one of the two actuation signals in phase with the reference clock signal. With reference to FIG. 1, this can be achieved, by way of example, by virtue of the reference value IF which determines the end of the sixth actuation phase F being generated by a phase discriminator 60 (illustrated in dashes) which is supplied with one of the two actuation signals—in the example the first actuation signal S1—and with the reference clock signal CLK. In this embodiment, the phase discriminator 60 is part of a control loop and is designed to ascertain a phase difference between the reference clock signal CLK and the actuation signal and to generate the reference value $I_F$ on the basis of this phase difference, with the aim of adjusting the phase difference between the actuation signal S1 and the reference clock signal to zero. The phase discriminator 60 is a controller which, depending on its embodiment, generates the reference value $I_F$ on the basis of a present phase difference (P control), on the basis of a past phase difference (I control) or on the basis of a present and a past phase difference (PI controller). Such phase discriminators are basic knowledge, which means that there is no need for any further explanations.

Such control of the frequency of one of the two actuation signals may make sense when reducing electromagnetic interference. In this embodiment, the reference clock signal can be used to set the spectrum of such interference, so that knowledge of this spectrum can be used to take suitable measures for attenuation. In this connection, it should be noted that setting the frequency and the phase of one of the two actuation signals also has a direct influence on the frequency and phase of the other of the two actuation signals.

Figure 9:
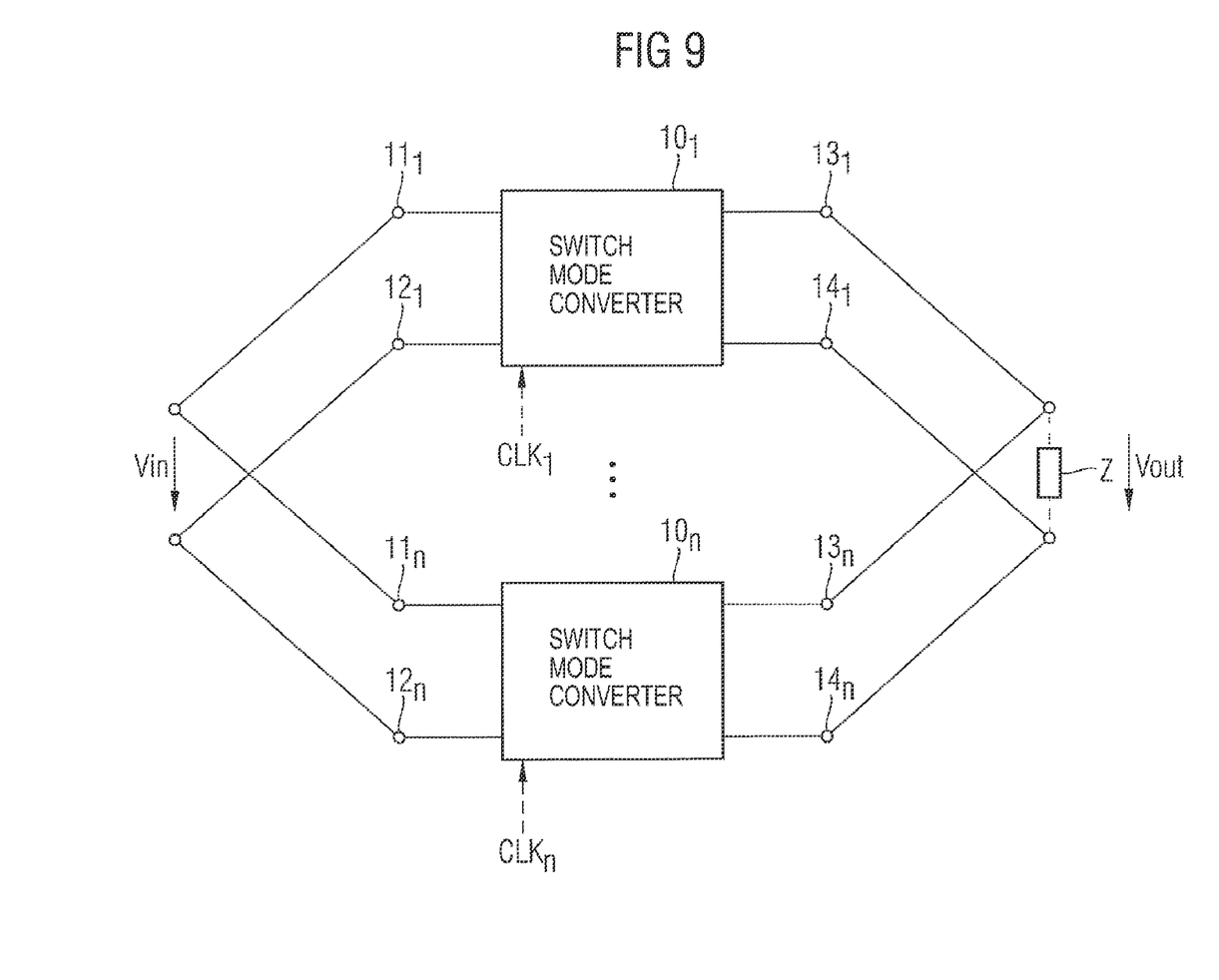
FIG. 9 illustrates one embodiment of a switch-mode converter arrangement which has a plurality of switch-mode converters connected in parallel.

With reference to FIG. 9, one example has provision for two or more switch-mode converters of the type explained above to be connected in parallel. FIG. 9 illustrates two such switch-mode converters by way of example, these being denoted by $10_1$ and $10_n$. These switch-mode converters are connected in parallel by virtue of their first input terminals $11_1$, $11_n$ being connected to one another and their second input terminals $12_1$, $12_n$ being connected to one another and by virtue of their first output terminals $13_1$, $13_n$ being connected to one another and their second output terminals $14_1$, $14_n$ being connected to one another. In this arrangement, the input terminals are supplied with the input voltage Vin and the output terminals are connected to the load Z. The individual switch-mode converters may have a common output capacitance or respective separate output capacitances, this not being illustrated in more detail.

The individual switch-mode converters are actuated, in particular, such that their actuation cycles are offset from one another in time, that is to say that the first switches (not illustrated) of the individual switch-mode converters are actuated at different times from one another. This may make sense both in respect of the power consumption of the overall arrangement and in respect of the electromagnetic interference: if the first switches are actuated at different times from one another, a more uniform power consumption is achieved by using the input voltage Vin than when the first switches are actuated simultaneously. In addition, peaks in the energy of the electromagnetic interference are avoided.

For example, the actuation cycles or the actuation of the individual first switches can be offset in time by virtue of the individual switch-mode converters being supplied with reference clock signals $CLK_1$, $CLK_n$, which have the same function as the clock signal explained with reference to figure, that is to say which respectively determine the clock and phase of the individual actuation cycles, and which are phase-shifted relative to one another. It is furthermore possible to determine one of the switch-mode converters as a master switch-mode converter and to use this switch-mode converter's first or second actuation signal to generate a plurality of versions which are phase-shifted relative to one another, which are respectively supplied to one of the other switch-mode converters as reference clock signals. The phase of the actuation cycles of the master switch-mode converter can optionally be set by a dedicated reference clock signal.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. A method for controlling a converter, including the cyclic actuation of a first switching element for applying an input voltage to an inductive storage element, and a second switching element, used as a first rectifier element in a rectifier arrangement, comprising:
    turning on the first switching element for a first turned-on period, during which the second switching element is off;
    turning on the second switching element at the end of the first turned-on period or after the end of the first turned-on period for a second turned-on period;
    monitoring a current flowing through the second switching element or the inductive storage element during the second turned-on period; and
    terminating the second turned-on period following a change in current direction of the current from a first current direction to an opposite second current direction.

2. The method of claim 1, comprising terminating the second turned-on period when the current flowing in the second current direction reaches a first threshold value.

3. The method of claim 2, comprising ascertaining a control signal dependent on the output voltage and wherein the first threshold voltage is dependent on the control signal.

4. The method of claim 2, comprising wherein the first threshold value is dependent on the input voltage.

5. The method of claim 1, comprising ascertaining the second turned-on period on the basis of the input voltage and the first turned-on period.

6. The method according to claim 1, comprising:
ascertaining during the second turned-on period a change in the current over time; and
ascertaining the second turned-on period on the basis of the first turned-on period and the ascertained change over time.

7. The method of claim 1, comprising generating a control signal dependent on the output voltage, and wherein the second turned-on period is dependent on the control signal.

8. The method of claim 1, comprising generating a control signal dependent on the output voltage is generated, and wherein the first turned-on period is dependent on the control signal.

9. The method of claim 1, comprising starting the first turned-on period when the current through the inductive storage element reaches a prescribed second threshold value after the end of the second turned-on period.

10. The method of claim 9, comprising wherein the second threshold value is zero.

11. The method of claim 1, comprising connecting a second rectifier element in parallel with the second switching element.

12. The method of claim 1, comprising wherein the second switching element is a MOSFET with an integrated free-wheeling diode.

13. The method of claim 1, comprising wherein the first switching element is a MOSFET.

14. The method of claim 1, comprising:
connecting the first switching element in series with the inductive storage element; and
connecting a series circuit containing the inductive storage element and the first switching element between the input terminals;
wherein the second switching element is connected between the inductive storage element and a first capacitive storage element is connected between the output terminals.

15. A circuit comprising:
an actuating circuit configured for generating a first actuation signal for a first switching element, used for applying an input voltage to an inductive storage element, and a second actuation signal for a second switching element, used as a first rectifier element in a rectifier arrangement, in a step-up converter; and
wherein the actuating circuit is configured so that during an actuation cycle it
generates a turn-on level for the first actuation signal for a first turned-on period and generates a turn-off level for the second actuation signal during this first turned-on period,
generates a turn-on level for the second actuation signal at the end of the first turned-on period or after the end of the first turned-on period for a second turned-on period, and
monitors a current flowing through the second switching element or the inductive storage element during the second turned-on period, and terminates the second turned-on period after a change in the current direction of this current from a first current direction to an opposite second current direction has been detected.

* * * * *